United States Patent [19]
Montague

[11] 3,709,276
[45] Jan. 9, 1973

[54] BEAD AREA CARCASS CORD ARRANGEMENT FOR RADIAL TIRES

[75] Inventor: Jean Bernard Montague, Cebazat, France

[73] Assignee: Compagnie Generale des Etablissements Michelin, raison Sociale Michelin & Cie, Clermont-Ferrand, France

[22] Filed: Dec. 18, 1970

[21] Appl. No.: 99,370

[30] Foreign Application Priority Data

Dec. 23, 1969 France..............................6944775

[52] U.S. Cl...............................................152/362
[51] Int. Cl..............................................B60c 9/04
[58] Field of Search......................................152/356

[56] References Cited

UNITED STATES PATENTS 3,245,455  4/1966  Lewis..................................152/356

Primary Examiner—James B. Marbert
Attorney—Brumbaugh, Graves, Donohue & Raymond

[57] ABSTRACT

A radial pneumatic tire comprises one or more carcass plies the cords of which are folded back around steel bead wires and terminate at some distance from the bead wires. At least in the case of the ply the ends of which are farthest from the bead wires, the cords in each folded-back portion are curved so that their length is substantially greater than the minimum distance between the ends of the cords and the closest bead wire. This extends the life of the tire by preventing separation of the cords from the tire elastomer.

6 Claims, 2 Drawing Figures

PATENTED JAN 9 1973　　　　　　　　　　　　　　　3,709,276

INVENTOR.
JEAN BERNARD MONTAGNE
BY
Brumbaugh, Graves, Donohue & Raymond
his ATTORNEYS

BEAD AREA CARCASS CORD ARRANGEMENT FOR RADIAL TIRES

BACKGROUND OF THE INVENTION

This invention relates to radial pneumatic tires and, more particularly, to a novel and highly-effective radial pneumatic tire having an improved arrangement of carcass cords in the vicinity of the beads.

In conventional radial tires, the radial carcass cords are arranged parallel to the inner wall of the tire from one steel bead wire to the other and, after passing around each wire, extend over a greater or lesser length in the bead or in the sidewall. In their portion thus folded back or reversed, the carcass cords are placed either parallel to the inner wall or in such a manner as to form, with the portion of the same cords extending along the inner surface of the tire, a practically closed loop surrounding the bead wire. If the carcass cords are distributed in several plies or layers, the lengths of the folded-back portions of the several plies are different so that the ply ends are staggered.

In this conventional structure, different regions of the sidewalls are differently reinforced and have different properties of elasticity or flexibility. The region between the tread and the end of the longest carcass ply folded-back portion is less reinforced than the rest of the sidewall. As a matter of fact, the carcass ply folded-back portion or portions have a reinforcing effect that is not negligible and that adds to the reinforcing effect provided by the portion of the carcass plies extending along the inner wall of the tire. This difference in elasticity between the "upper" zone of the side-wall, that is to say, the region adjacent to the tread, and the "lower" zone, that is to say, the region adjacent to the steel bead wire, may make itself evident in various ways. Thus when the tire is inflated, one can note a change in curvature of the sidewall at the location of the end of a folded-back portion of carcass plies, that is to say, at the place of the change of extensibility of the sidewall. In addition, one can note the appearance at the end of the folded-back portion of a carcass ply as a result of prolonged travel of the tire of a separation of the cords: i.e., the cords become detached from the surrounding rubber. The separation is progressive and advances in the direction towards the bead wire and makes the tire unsuitable for use; the region of the cord ends located at the boundary of areas of very different extensibility and flexibility is, as a matter of fact, a region of high stresses.

In order to avoid these drawbacks, one generally selects a carcass structure that makes the carcass of poor extensibility even in the least reinforced region. This is true in particular when using a carcass comprising a ply of steel cords. This is also true when using plies of cords of textile material—rayon, polyamide or polyester; in this latter case, the number of carcass plies is always excessive, and one could by reducing their number still retain a more than sufficient margin of safety to satisfy the stresses to which the carcass is subjected as a result of the inflation pressure and the load borne by the tire. The carcass is thus reinforced and stiffened excessively in order to reduce the self-destructive effect coming from differences in rigidity between adjacent regions of the sidewall.

SUMMARY OF THE INVENTION

An object of the invention is to remedy the shortcomings of conventional radial tires noted above and, in particular, to provide a new arrangement of the folded-back portions of the plies that makes it possible to use a lightened carcass reinforcement without jeopardizing the life of the tire and specifically without causing separation of the folded-back portions of the plies.

The foregoing and other objects are attained in accordance with the invention by the provision of a pneumatic tire having a carcass comprising one or more plies the cords of which are folded back around steel bead wires and terminate at some distance from the latter. At least in the case of the ply whose ends are farthest from the bead wires, the folded-back portions of the cords are curved in such a manner that their length is substantially greater than the minimum distance between the end of each cord and the periphery of the closest bead wire.

In one embodiment of the invention, the curve of the folded-back portion of the carcass ply whose ends are farthest from the bead wires is concave as viewed from the outer side of the sidewall, the point of tangency with the wire and the end of the folded-back portion being the points farthest away from the inner surface of the sidewall. In another embodiment, the folded-back portion has a sinusoidal shape and the point closest the inner surface of the sidewall of the tire is substantially at the middle of the folded-back portion.

In the case of a folded-back portion of concave outline, the end of the folded-back portion is preferably at a radial distance from the base of the bead greater than the height of the portion of the bead intended to rest against the edge of the rim when the tire is loaded, while the point of the folded-back portion closest to the inner surface of the sidewall of the tire is at a radial distance from the base of the bead less than the height of the bead portion.

By imparting to the folded-back portion of a carcass ply a curved outline, that is to say, by giving it a length longer than the shortest path connecting the end of the folded-back portion to the periphery of the bead wire, one neutralizes the stiffening effect caused by the folded-back portion, especially with respect to forces acting in a radial direction. The latter forces are the preponderant ones.

Furthermore, by spacing the end of the folded-back portion away from the portion of the carcass cords extending along the inner surface of the sidewall of the tire, which is done by imparting a concave shape to the folded-back portion, one causes a greater thickness of rubber to participate in the stresses, in particular the shearing stresses originating in the region of the end of the folded-back portion. Another effect of the concave or undulated shape of the folded-back portion is to localize the bending or articulating movements of the sidewall or bead at the level of the region of the folded-back portion located closest to the inner surface of the sidewall of the tire, that is to say, at a certain distance from the sensitive area adjacent to the end of the folded-back portion. To be sure, it is advisable to locate this relatively flexible region at a practically equal distance from both the bead wire and the end of the folded-back portion, and furthermore at a distance from the base of the bead less than the height of the rim edges in order to facilitate the seating of the bead on the edge of the rim.

BRIEF DESCRIPTION OF THE DRAWING

An understanding of additional aspects of the invention may be gained from a consideration of the following detailed description of the preferred embodiments thereof, in conjunction with the appended figures of the drawing, wherein.

DESCRIPTION OF THE PREFERRED EMBODIMENTS

Figure 1:
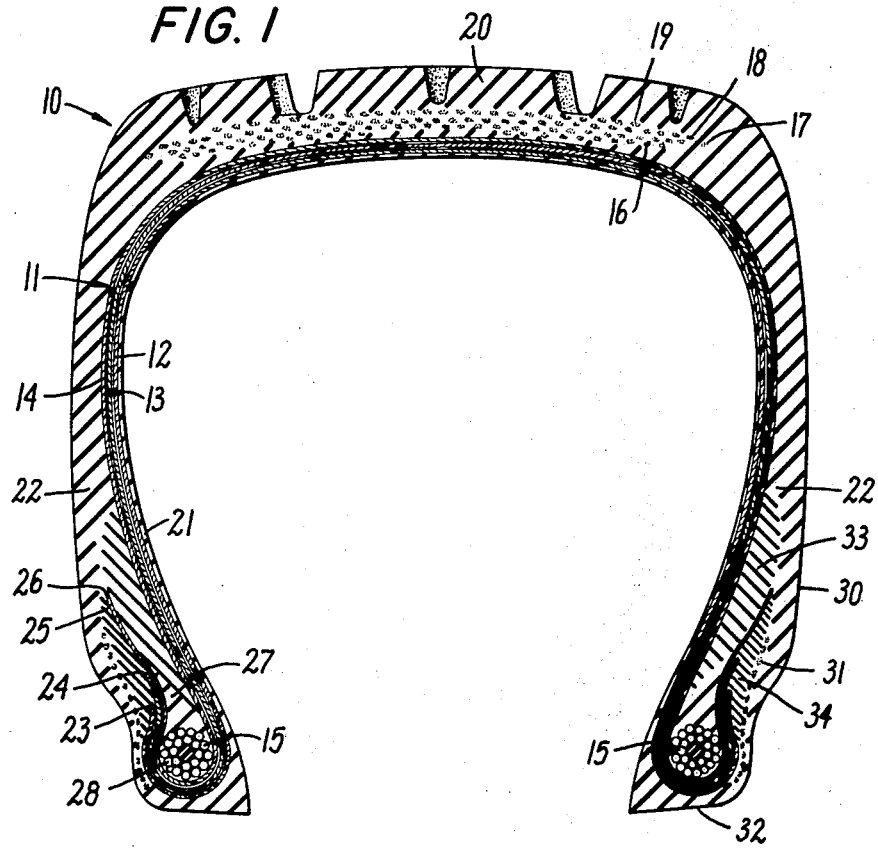
FIG. 1 is a view in radial section of a preferred embodiment of a heavy-truck tire in accordance with the invention.

FIG. 1 shows in radial section a tire 10 of size 10.00-20, that is to say, a truck tire for a load of 2.5 tons.

The tire 10 comprises a radial carcass 11 having three plies 12, 13 and 14 of composite cords of polyamide of type 1680/3. That is, each composite cord is composed of three smaller cords of 1680 denier each. The carcass is anchored around steel bead wires 15 in a manner which will be described in detail. The tire furthermore comprises a top reinforcement including plies 16, 17, 18 and 19 of steel cords, reinforcing a tread 20.

The cords of the three carcass plies 12, 13 and 14 are arranged between the two steel bead wires 15 in radial planes of the tire, parallel to the inner surface 21 of the sidewall of the tire, both below the tread 20 and in the regions of the sidewalls 22.

The carcass ply 12 that is closest to the inner surface 21 of the sidewall terminates at 23 in the vicinity of the bead wires 15. The following ply 13 terminates at 24, slightly farther away, but still near the bead wires 15. On the other hand, the last ply 14 has a relatively long folded-back portion 25 terminating at 26. In accordance with the invention, the folded-back portion 25 has a concave, sinusoidal, undulated, zigzag or otherwise curved shape. Its end 26 is relatively far from the surface 21, the distance between the end 26 and the closest portion of the ply 14 extending along the inner surface 21 being slightly greater than the diameter of the bead wires 15. The point 27 of the folded-back portion 25 closest to the inner surface 21 is substantially the middle of the folded-back portion and at an equal distance from the end 26 and from the point of tangency to the bead wire 28.

The bead, i.e., the portion of the tire that is intended to bear against the rim, furthermore comprises along its outer wall 30 a stiffener 31 composed of metal cords that individually form angles of about 30° with the steel bead wire. This stiffener extends over a height which corresponds to that of the edge of the rim (not shown) and is intended to reinforce the surface layer that bears against the rim. The point 27 of the folded-back portion 25 is at a radial distance from the base of the tire bead 32 which is substantially less than the height of the stiffener 31 and that of the edge of the rim.

The concave arrangement of the folded-back portion 25 is easily obtained when the tire is manufactured. Various profiled pieces of rubber such as 33 and 34 are arranged between the carcass plies and their folded-back portions and between the latter and the stiffener 31, respectively.

Comparative tests have been made of a tire in accordance with the invention and a tire of conventional type differing from the tire of the invention by the fact that the folded-back portion 25 extends from the point 27 parallel to the inner surface 21. Under identical test conditions, separation of the folded-back portion 25 takes place, in the case of a tire in accordance with the invention, only after traveling for a number of miles at least five times greater than the number of miles of travel sufficient to produce separation in the case of the conventional tire. As can be seen, the improvement is considerable: a truck tire having a radial carcass formed of only three plies of polyamide cords is normally not possible without the invention. The invention makes it possible to reduce the number of polyamide plies of a truck tire from six or eight to three and even to two.

Figure 2:
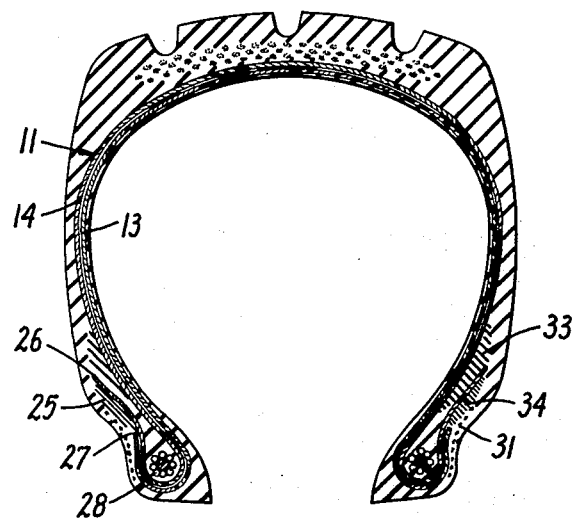
FIG. 2 is a view in radial section of a preferred embodiment of a tire for a delivery truck or passenger car in accordance with the invention.

FIG. 2 shows a preferred embodiment of a tire in accordance with the invention in size 6.50-16. The radial carcass 11 is composed here of two plies 13 and 14 of polyamide cords of type 840/2. The arrangement of the carcass is similar to that shown in FIG. 1, except that the carcass has only two plies instead of three.

Many modifications of the embodiments disclosed herein will readily occur to those skilled in the art upon reading this specification. For example, the invention is independent of the number of carcass plies and of the selection of material (steel, rayon, polyamide, polyester, etc.) for the formation of the carcass cords. Also, the present invention and that disclosed in my copending application Ser. No. 99,371, for "Elastomers Associated with Cords of Radial Tires at Points Close to and Removed from Beads," filed concurrently herewith, may be embodied in the construction of the same tire. Accordingly, the invention is to be construed as including all the embodiments thereof within the scope of the appended claims.

I claim:

1. A radial pneumatic tire comprising a pair of beads, a pair of bead wires respectively reinforcing said beads, a pair of sidewalls respectively joined to said beads, a tread extending between said sidewalls, and at least one carcass ply, said carcass ply being formed of cords and including a portion proper to each bead folded back around the respective bead wires, the cords in each folded-back portion being curved so that their length is substantially greater than the minimum distance between the ends of the cords and the closest bead wire, and each folded-back portion in each bead following a common path with the other folded-back portions in the same bead, which comes first closer to the carcass body then away from it with all ply ends distributed along such path.

2. A tire according to claim 1 wherein the cords in each folded-back portion are curved in such a manner that the regions thereof that most closely approach the inner surface of the tire are substantially midway between the ends of the cords and the respective bead wires.

3. A tire according to claim 2 wherein said regions are within said respective beads and the ends of the cords are in said respective sidewalls.

4. A tire according to claim 1 wherein the distance measured axially of said tire between the ends of said folded-back portions and said carcass ply excluding said folded-back portions is at least as great as the greatest diameter of said bead wires.

5. A tire according to claim 1 further comprising at least one additional carcass ply, said additional carcass ply being formed of cords and including a portion proper to each bead folded back around the respective bead wires on the outside of said one carcass ply, the cords in each folded-back portion of said additional carcass ply terminating at points that are closer to the respective bead wires than are the points at which the cords in said one ply terminate.

6. A tire according to claim 1 intended to be fitted to a rim having two lateral edges and wherein the end of the folded-back portion is at a radial distance from the base of the bead greater than the height of the portion of the bead intended to rest against an edge of said rim, while the point of the folded-back portion closest to the inner surface of the side-wall of the tire is at a radial distance from the base of the bead less than said height.

* * * * *